United States Patent [19]

Shaffer

[11] 4,232,639
[45] Nov. 11, 1980

[54] ENGINE WITH ADDITIONAL SHARED FLOW CONTROL RUNNER FOR TWO CYLINDERS

[76] Inventor: Donald J. Shaffer, P.O. Box 88, Upper Strasburg, Pa. 17265

[21] Appl. No.: 24,049

[22] Filed: Mar. 26, 1979

[51] Int. Cl.³ .............................................. F02B 75/18
[52] U.S. Cl. .................................................. 123/52 MV
[58] Field of Search .......... 123/52 M, 52 MV, 188 M

[56] References Cited
U.S. PATENT DOCUMENTS

| | | | |
|---|---|---|---|
| 3,364,911 | 1/1968 | Baudry et al. | 123/52 MV X |
| 3,861,376 | 1/1975 | Ashley | 123/188 M X |
| 4,030,459 | 6/1977 | Hori et al. | 123/52 M |

Primary Examiner—Charles E. Phillips
Attorney, Agent, or Firm—Thomas E. Beall, Jr.

[57] ABSTRACT

Adjacent expansible chambers of an engine are provided with an intake runner set employing at least three runner passages conducting the working fluid from a common plenum to the expansible chambers, with at least one of the runners only serving one of the expansible chambers, at least another of the runners serving only the other expansible chamber, and at least still another of the runners commonly serving both of the expansible chambers. Preferably, a flow control is provided for one or more of the runners, preferably the common runner to manually or automatically control the flow of fluid through the common runner. Thereby, the runners for the expansible chambers may be adjusted in effective cross sectional area for tuned efficiency at different speeds. Preferably, such runners extend through the intake manifold and head ports without communication throughout their extent.

9 Claims, 10 Drawing Figures

FIG. 3
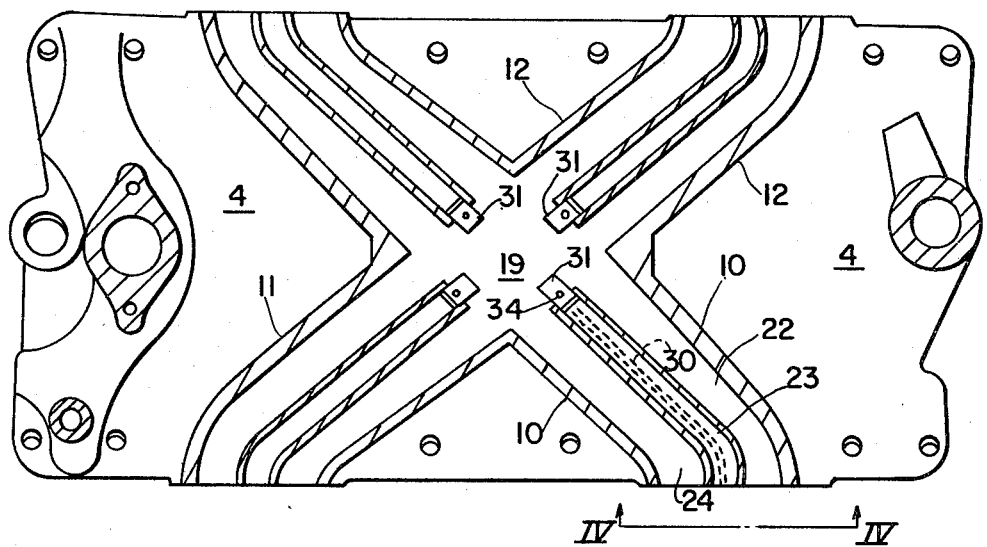
FIG. 4
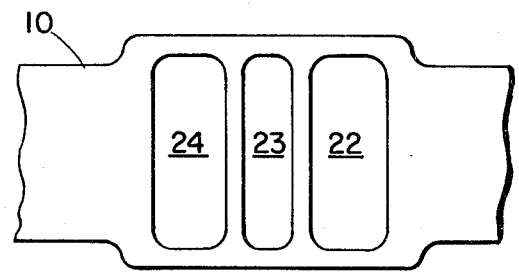
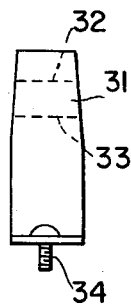
FIG. 5
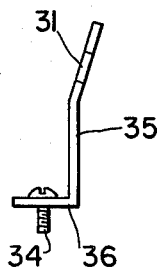
FIG. 6
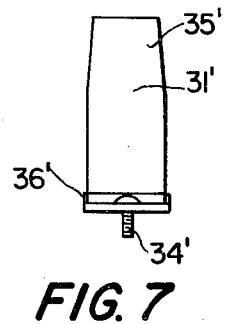
FIG. 7
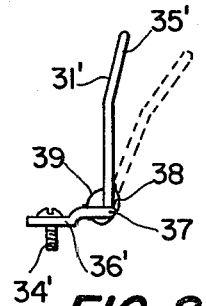
FIG. 8

ENGINE WITH ADDITIONAL SHARED FLOW CONTROL RUNNER FOR TWO CYLINDERS

BACKGROUND OF THE INVENTION

The present invention relates to the construction of the intake passageway of an engine, particularly to the intake passageways in an intake manifold and head for an internal combustion engine.

The intake ports of a head and intake runners of an intake manifold operate most efficiently at one speed of the engine within the designed range of speeds for the engine. If this design speed is relatively low for the range of speeds, the engine will operate efficiently at low speeds, but at high speeds the passageways will "choke", that is they will not be able to provide sufficient flow of fluids to the engine for efficient operation. On the other hand, if the design speed for the passageways is relatively high for the speed range, the engine will operate efficiently at high speed, but at low speed it will operate quite inefficiently and rough. It is well known to provide after market intake manifolds that will provide for increased horsepower and fuel efficiency at high speeds, but the low speed or street use operation suffers.

For the standard "small-block Chevrolet engine", the intake runners for two adjacent cylinders are parallel to each other and share a common dividing wall in the head. It has been a common practice to grind the outer walls of this intake runner, but the amount of enlargement is really restricted by adjacent cooling chambers, push rods and necessary wall strength. It is also common to grind away the sides of the dividing wall to make it thinner. Each of these procedures will raise the speed at which the runners are "tuned" or will operate most efficiently, while at the same time decrease the efficiency for the lower speed range of the engine. This is satisfactory for racing purposes where the engine is run at very high speeds, and very seldom run at low speeds, but it is unsatisfactory for normal usage. Therefore, it is necessary for people who are racing to have one head designed for racing and one head designed for street use, and many people have several different heads depending upon the type of racing or street usage that will in turn determine the speed at which the engine is usually run. It is even known to completely grind away and eliminate the dividing wall within the head so that effectively the adjacent cylinders will share a common runner within the head. This will provide the very high flow volume needed at extremely high speeds, but at a great loss for the remaining speed range of the engine.

The volume of air (actually fuel air mixture for carbureted internal combustion engines, or only air for injected engines, or combustion products for external combustion engines) increases with increased engine speed, and it is easy to understand that the intake runners may be too small to provide this flow of air and it will therefore become "choked". However, the converse is also true that the intake runners may be too large for a lower speed in that the air will tend to be somewhat dead with high inertia, that is at low speeds it is desirable to have a smaller runner so that the velocity of the air may be maintained for efficiency of charging. All of this is well known in the design of intake runners.

SUMMARY OF THE INVENTION

It is an object of the present invention to improve the flow of fluids through the intake runner of an engine over a wide speed range.

According to the present invention, at least two cylinders share at least one common runner while at the same time having at least one exclusive runner. In this manner, the effective flow through cross sectional area of the runner for each cylinder is increased, without increasing the combined runner area, as compared to conventional runners, because one runner is effective for both cylinders. This has the advantage of a high flow through cross sectional area for high speed operation, while for low speed operation the two runners will provide a satisfactory flow velocity due to the division, and/or one runner may be preferred so that it will operate predominantly at low speed and the second or shared runner will not come into operation until high speed, and/or controllable or automatic flow blockers may be employed for one or more runners, preferably the common runner, so as to effectively reduce the cross sectional area at low speed while permitting it to be higher for high speed.

BRIEF DESCRIPTION OF THE DRAWING

Further objects, features and advantages of the present invention will become more clear from the following Detailed Description of a Preferred Embodiment, as described with respect to the accompany drawing, wherein:

FIG. 3 is a cross sectional view of the intake manifold taken along line III—III of FIG. 2;

FIG. 4 is a view taken from line IV—IV of FIG. 3;

FIG. 5 is a detailed view, enlarged, of an element shown in FIG. 3;

FIG. 6 is a view taken at right angles to the view of FIG. 5;

FIG. 7 is a view corresponding to FIG. 5, but of a modification of the element of FIG. 5;

FIG. 8 is a view corresponding to FIG. 6, but of the modification;

DETAILED DESCRIPTION OF A PREFERRED EMBODIMENT

Figure 1:
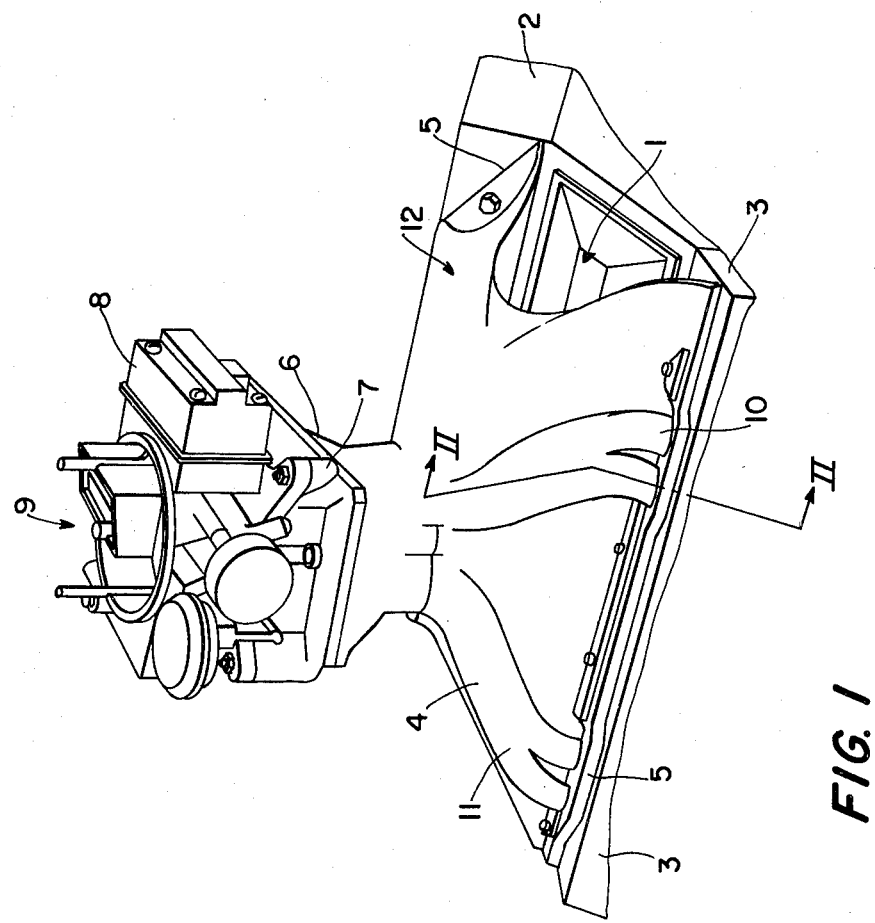
FIG. 1 is a perspective view of a conventional carburetor mounted upon an intake manifold leading to partially shown heads and block of a V-8 engine.

The preferred embodiment of the present invention applies to and is illustrated with respect to an internal combustion engine, although according to its very broad aspects, it is contemplated that it is usable with respect to external combustion engines, engines of either reciprocating piston or rotary piston type, carbureted internal combustion engine or fuel injected internal combustion engines, or the like type of engines wherein gases are drawn through an intake manifold and intake ports to expansible chambers, wherein adjacent runners of the intake manifold or ports supply two expansible chambers.

The preferred embodiment in the drawing is with respect to a V-8 engine, specifically the Chevrolet small-block engine, heads that are conventional except for the modifications to be explained herein, an intake manifold that is conventional except for the modification explained herein, and a conventional single carburetor. The invention is equally applicable to such a setup with two carburetors.

The invention is most advantageous with respect to an expansible engine of the type wherein two intake runners, for air, air-fuel mixture, or combustion products, are adjacent to each other and lead to intake ports of two adjacent expansible chambers. In the following description, air will broadly refer to a working fluid such as air for an injected engine, an air-fuel mixture for a carbureted engine, or combustion products for an external combustion engine.

While FIG. 1 broadly discloses an entire engine, the remaining Figures are specific to those portions of an otherwise specific conventional engine that are different in structure according to the present invention.

In FIG. 1, there is shown a conventional "small-block" Chevrolet internal combustion engine block 1 of a V-8 configuration. Two mirror image heads 2, 3 are mounted on the block in a conventional manner. These heads are conventional heads for this type of block, except for the modifications of the air passages that will be noted below. Secured to each of the heads 2, 3, there is an intake manifold 4, which has flanges 5 respectively bolted to the heads 2, 3. This intake manifold 4 is conventional for this type of engine, except for the specific design of the intake runners according to the present invention, as mentioned hereinafter. Secured to the top 6 of the intake manifold 4 by means of bolts passing through respective flanges 7, there is a conventional carburetor 8 having an air intake 9. Those portions of the carburetor, intake manifold, heads and block that are not specifically shown and described are conventional in detail.

In a conventional manner, such a V-8 engine has eight cylinders arranged in a V shape, with four cylinders on each side. The head 2 covers four cylinders on one side, while the head 3 covers four cylinders on the other side. The intake manifold has four sets of intake runners that are similar in construction. One set of intake runners 10 leads from a plenum chamber in the top portion 6 of the intake manifold to the intake ports in the head 3 for two adjacent cylinders, while the other set of runners 11 for the head 3 leads from the same common plenum chamber of the intake manifold to the intake ports of head 3 serving a different pair of adjacent cylinders. A third set of intake runners 12 lead from the common plenum chamber within the upper portion 6 of the intake manifold to the adjacent ports of head 2 for a third pair of adjacent cylinders. In a similar manner, a fourth set of intake runners (not shown in FIG. 1) lead from the common plenum chamber to the fourth set of adjacent intake ports for the head 2 serving the remaining two adjacent cylinders.

Figure 2:
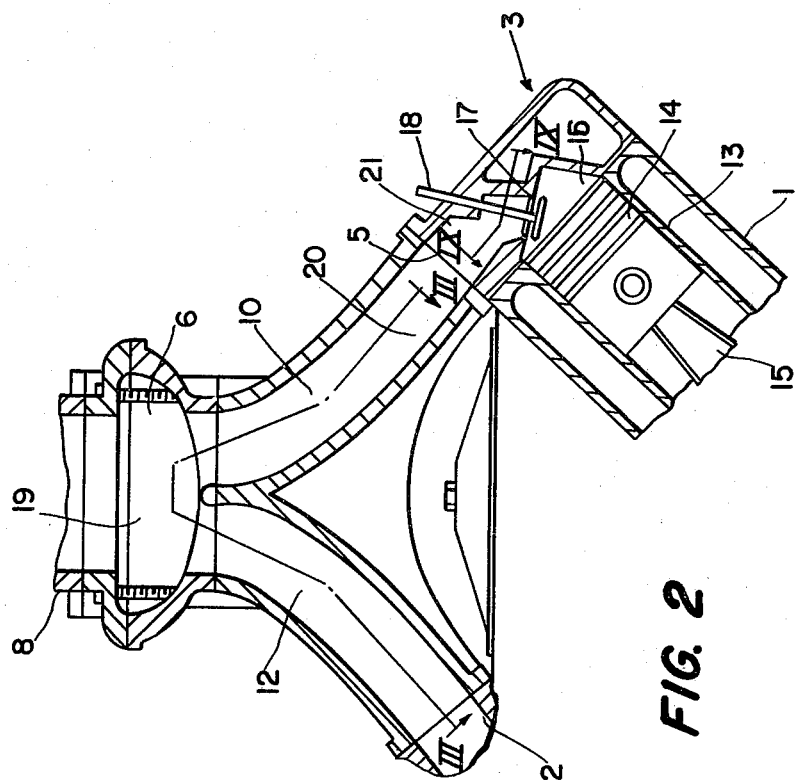
FIG. 2 is a cross sectional view taken along line II—II of FIG. 1.

In FIG. 2, a portion of the block 1 is shown with one of its cylinders 13 containing a conventional piston 14 mounted on a crank arm 15 leading to a crankshaft (not shown), for reciprocating the piston 14 within the cylinder 13 so as to form an expansible chamber 16 that is closed by the head 3. In a conventional manner, the head 3 includes a valve seat 17, a valve 18 for the intake, and the conventional mechanisms to complete the engine which are not shown, but which include spark plug, exhaust valve, and valve operating mechanism. The air-fuel mixture coming from the carburetor 8 fills the common single plenum chamber 19, from where it is fed to the individual sets of runners including 10, 11, 12. The air-fuel mixture passing through the runner set 10 is fed through the runner portion 20 within the intake manifold and the runner portion 21 within the intake port of the cylinder head 3. When the valve 18 is opened, the intake will pass through the valve 18 between the valve 18 and the seat 17 and into the expansible chamber 16 as the piston 14 is lowered during the intake stroke.

From FIGS. 1–3, it is seen that the intake runner sets are all substantially the same in essential features, so that only the runner set 10 will be described in detail. Preferably, the intake manifold 4 is cast in one piece, with the runner set 10 including a first runner passage 22, a second runner passage 23, and a third runner passage 24, although more runner passages could be provided. Each of these runner passages is completely separate from the others, that is, their walls are continuous throughout their length, for example as shown in FIG. 4.

Figure 9:
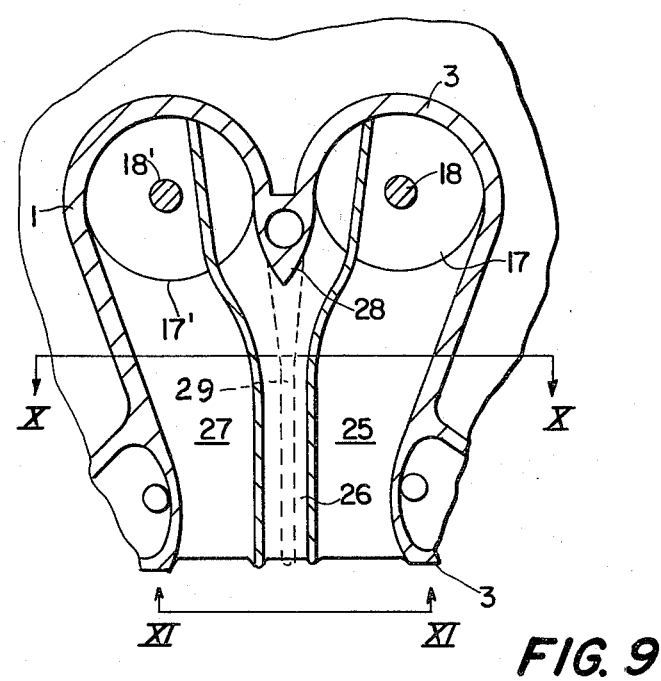
FIG. 9 is a cross sectional view taken through a portion of the head, enlarged, taken along line IX—IX of FIG. 2.

Although FIG. 4 shows the discharge end configuration for the runner passages of the intake manifold as seen from line IV—IV of FIG. 3, the view from line XI—XI of FIG. 9 for the head would be substantially the same, and the configuration of the passages would be identical for both the head and manifold at this common plane where they are connected, with a conventional gasket, as more fully shown in FIG. 2. As seen in FIGS. 3 and 4, the intake manifold of the present invention differs from the conventional intake manifold for this type of engine in that at least three intake runner passage portions 22, 23 and 24 are provided instead of only two in the conventional manifold.

Figure 10:
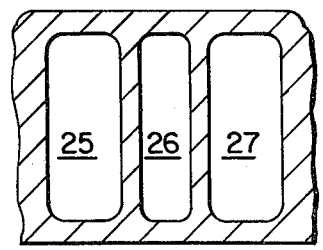
FIG. 10 is a cross sectional view taken along line X—X of FIG. 9.

As seen in FIGS. 9 and 10, the head 3 is provided with adjacent valves 18 and 18' that cooperate with adjacent valve seats 17, 17', which lead to adjacent cylinders (not shown) within the block, respectively. The runner passage portion 25 within the cylinder head port lines up with the passage 24, the cylinder head passage 26 lines up with the passage 23, and the cylinder head passage 27 lines up with the passage 22, when they are assembled as shown in FIG. 2, with a suitable gasket being employed so that there is no communication between the passageways 25, 26 and 27 or the passages 22, 23, 24 at the place where the head joins the manifold. As shown in FIG. 10, the walls forming the runner passages 25, 26 and 27 are continuous for the full length of the passages, so that there is no communication between them. That portion of the partition wall between the passages 25 and 26 or the partition wall between the passages 26 and 27 that overlies respectively the valves 18, 18' extends down to close proximity to the valves when they are in their closed position. With this structure, when the valve 18 is opened, it will draw air from runner passages 25 and 26, but not from 27, and correspondingly when the valve 18' is opened, it will draw air from runner passages 26 and 27, but not from 25.

With respect to the runner set 10, which is also true of the other similar runner sets, the runner portions 22, 23 and 24 only communicate with each other where they open into the common plenum 19, the runner portions 25 and 27 do not communicate with each other, the runner portions 25 and 26 communicate with each other only when the valve 18 is opened, and the runner portions 26 and 27 only communicate with each other when the valve 18' is opened. As a modification, the partition between runner portions 25 and 26 and the partition between runner portions 26 and 27 may not extend all the way down to the closed position of the valves 18 and 18', respectively and/or they may not extend all the way up, as seen in FIG. 9, to the wall of the head 3 and therefore there may be some communication between all of the runner portions 25, 26 and 27 within the vicinity of the valves 18 and 18'. However this communication provided by the modification is easily permissible because of the resistance to the flow of air, for example, from runner portion 27 through the communication passage adjacent valve 18' when 18' is closed, reversely around the partition wall 28, and then back through runner portion 26, for example, to the opened valve 18; as a result of this resistance due to small openings and reversals of flow direction, communication between passages 25 and 27 is effectively not present or negligible even with respect to the modification.

In the conventional manner, valve 18 will be opened for the intake stroke at a time when valve 18' for the adjacent cylinder will be closed. With no restriction to the flow of fluid within runner set 10, other than that mentioned above, at low speeds the runner passage 25 will be preferred as opposed to the greater resistance provided by runner passage 26, so that flow velocity will be maintained in runner passage 25 at slow speed for efficient operation. At high speed, with valve 18 opened, both runner portions 25 and 26 will supply fluid to the cylinder served by valve 18, for efficient high speed operation.

By way of comparing the present invention to the prior art, a conventional head for this type of engine would not have the partitions between runner portions 25 and 26 and between runner portions 26 and 27, and in their palce would have a single partition 29 extending completely from the wall 28 to the gasket plane where the head would connect to the manifold, and the conventional manifold for this type of engine would similarly have a partition 30 (only the conventional partition for set 10 is shown and there is no similar showing for the other runner sets). The conventional partitions in FIGS. 9 and 3 are shown in dotted lines. From this comparison, it may be seen that with the conventional head and manifold, only a single runner would be provided between the plenum chamber 19 and the valve 18, and this single conventional runner would have an effective cross sectional area substantially more than the runner portions 25 and 24, but substantially less than the combined effective cross sectional area of runner portions 25, 26, 24, 23. Thus, it is seen that runner portions 25, 24 when used alone or preferably for intake 18 are more efficient at low speeds than would be the conventional single runner, while at the same time the combined effect of runner portions 23, 24, 25, 26 would be more efficient than the conventional single runner at high speeds. Thus, the efficiency of the engine is greatly improved over a wider range of speeds.

While only three runners for a runner set serving adjacent cylinders have been shown with one of the three being commonly used by the adjacent cylinders have been described in detail for purposes of the preferred embodiment, it is contemplated that according to the present invention more runners could be employed for the same set, for example, there could be two common runners in addition to the two exclusive runners, which would be particularly advantageous with respect to the control to be described hereinafter, specifically in that one of the two common runners could be separately controlled from the other.

While control, either selectively fixed or manually adjustable, or automatically controlled, is not necessary, it is preferred as providing the most desirable effects according to the preferred embodiment of the present invention. Such controls are shown in FIGS. 3-8.

In FIG. 3, the inlet for each of the common runner portions that communicates with the plenum 19 is provided with a flow control device. Since all of these devices are preferably identical in structure and operation, only the control device with respect to runner portion 23 for runner set 10 will be described in detail.

As shown in FIG. 3, the flow controller 31 is mounted in the entrance of the runner portion 23 by means of a screw 34 threaded into a corresponding hole in the floor of the plenum chamber 19. As more clearly shown in FIGS. 5 and 6, the flow control device 31 is generally of a L-shape, with leg 35 generally corresponding to the cross sectional area of runner portion 23 (it being shown on an enlarged scale in FIG. 5 with respect to FIG. 4, and on an even larger scale than shown in FIG. 3). As shown, the leg 35 will almost completely block flow of fluid through the runner portion 23, so that when in place the engine will operate most efficiently at a low speed by employing, for example, only runner portions 25, 24 for valve 18, which will mean that the engine will operate most efficiently at a speed lower than it would operate with a conventional partition 29, 30. For racing or high speed usage, it would only be necessary to remove the carburetor 8, unscrew the four screws 34 and remove all of the flow control devices 31 so that the most efficient operating speed would be greatly increased and higher than that obtained with a conventional partition 29, 30. The other leg 36 of the flow control device would form an angle with respect to the leg 35 depending upon the specific configuration of the manifold, and is present only for mounting purposes. The dash lines 32 and 33 represent indicia provided on the control device marking suggested cut lines that would correspond to specific stepwise adjustments in the most efficient low speed operation when the flow control device is used after having the material above the respective line removed to partially open up the runner portions 23, 26.

A modified form of the flow control device is shown at 31' in FIGS. 7 and 8, and differs only from the device 31 by employing a pivoted spring urged connection between the legs 35' and 36', provided by a pivot pin 37, torsion spring 38, and pivot stop 39. The stop 39 will prevent the leg 35' from pivoting about the pin 37 in the counter-clockwise direction as seen in FIG. 8, which would be toward the plenum 19, but does permit the clockwise pivoting of the leg 35'. The torsion spring 38 resists the clockwise pivoting of the leg 35' from its full line position. At low speed operation of the engine, the leg 35' will assume its full line position of FIG. 8 blocking or substantially blocking the entrance to the runner portion 23. With increased demands on air flow, for example due to higher speed operation of the engine, the engine suction will produce forces that will pivot the leg 35' clockwise to increase the flow of fluid through the runner portion 23 to meet the higher demands of the engine. The torsion spring 38 is so selected that it will continuously open the runner portion 23 by permitting pivoting of the leg 35' according to increased demands of the engine as desired, with it being preferable that the leg 35' will lay flat against the bottom of the runner portion 23 to effectively present no resistance to the flow of air through the runner portion 23 at engine speeds greater than a fixed engine speed, remain in its closed full line position of FIG. 8 at engine speeds lower than a fixed speed with stable throttle operation, and have varying degrees of opening between such fixed speeds.

The following modification is also contemplated and intended to be covered by the broader aspect of the present invention. Plates 35' may be pivotally mounted as shown in FIGS. 3, 7 and 8, and have a shaft to control their pivoting that extends outwardly and is controlled, for example, by a speed governor so as to positively rotate the leg 35' according to speed, or which shafts are connected to be rotated by actuation of the accelerator linkage, for example. Further, it is contemplated that the leg 35' may be reciprocally mounted so that it may open and close in the nature of a gate valve, with the above-mentioned automatic controls. Also, the gate valve or pivot shaft modifications may be manually operated with some type of lock or indexing means for various positions, so that they may be manually changed from the passenger compartment or manually changed from the engine compartment without disassembly of any other structure.

At the point where the legs 35, 35' are located, the runner portion 23 will most preferably have a rounded configuration, similar to that shown in FIG. 4. To assure complete closure or shutdown of the passage or runner portion 23 in one position of the leg 35, it would be preferable to construct the leg 35, 35' of a corresponding rounded configuration rather than that illustrated. Also, to improve fluid flow and decrease resistance when the leg 35, 35' is partially opened, for example in the dotted line position of FIG. 8, it would be preferable to have the leg 35 arcuate in cross section perpendicular to a longitudinal vertical line that would appear in FIG. 5, so that it would appear arcuate in FIG. 3 convexly facing the plenum 19, which would be a simple modification of the structure shown. To further improve the fluid flow, it would be desirable to have the ends of the walls forming the runner portion 23 that are adjacent the plenum 19 constructed so that they would be rounded. As mentioned previously, the walls that form the runner portion 26 could also be shortened so that in FIG. 9 they would extend only over a portion of the valve seat 17, 17', or even stop before they reach the valve seat 17, 17', or even end in the vicinity of a line that in FIG. 9 would be parallel to the line X—X and touch the tip of the partition 28; such variations are possible because the resistance of air flow to effectively making a U-turn from passageway 27, for example, over closed valve 18' and back into passage 26 and again through a U-turn to opened valve 18 would be highly unlikely and furthermore not materially add to the air flow to opened valve 18 so that effectively even with such modifications it can be said that with valve 18 opened it would draw air only from runner portions 25, 26 and not from 27.

While a preferred embodiment of the present invention has been set forth for purposes of illustration in addition to the advantages gained by the specific details, with modifications, still further embodiments, modifications and variations are contemplated according to the present invention, all as determined by the spirit and scope of the following claims.

What is claimed is:

1. A head for an internal combustion engine having an air intake manifold and engine block with plural cylinders, comprising:
    a first surface for engagement with the corresponding surface of an engine block having in it the engine cylinders;
    a plurality of intake ports opening through said first surface so as to be in communication with respective cylinders when said head is assembled on the block;
    a plurality of exhaust ports extending through said first surface so as to be in communication respectively with the cylinders when said head is assembled on the block;
    a valve seat in each of said intake ports and exhaust ports;
    a plurality of intake and exhaust valves movable between opened and closed positions with respective ones of said intake and exhaust valve seats;
    a second surface on said head for mating engagement with an intake manifold;
    an intake opening in said second surface;
    an intake passage extending from said intake opening to two adjacent intake valve seats that respectively lead to two adjacent intake ports that are respectively in communication with adjacent cylinders when said head is assembled on the block;
    said intake passage having at least two partitions dividing said passage into at least three parallel non-communicating conduits having entrance ends at said intake opening of said second surface and exit ends at said two adjacent intake valve seats; and
    said passage and partitions being so constructed as to form means for conducting a working fluid from said one intake opening in said second surface through a first one of said conduits and a second one of said conduits to one intake valve seat when its associated valve is open exclusive of the third one of said conduits, and for conducting a working fluid through said one intake opening in said second surface through said second and third conduits to the other of said intake valve seats when its associated valve is open exclusive of said first conduit, so that two out of the three conduits may be used for each of the cylinders to provide a large flow passage with good flow characteristics provided by a partition at high engine speed.

2. The head of claim 1, wherein each of said conduits defines a central flow line extending along its entire length, and wherein the central flow lines of all of the conduits are within a common plane.

3. The head of claim 1, wherein said first and third conduits are aligned with their respective valve seats, and said second conduit has its central flow line bisecting the position of said valve seats.

4. The head of claim 1, further in combination with an intake manifold having first, second and third intake runner portions in parallel fluid flow connection to said intake opening in said second surface of said head, and each of said runner portions being aligned with and in communication with a respective one of the three conduits.

5. The head of claim 4, including a movable flow controller means having one position restricting fluid flow through said second runner portion and second conduit for low engine speed operation, and a second position providing unrestricted flow of fluid through said second runner portion and second conduit for high speed engine operation.

6. The apparatus of claim 5, further including control means automatically responsive to the speed of the engine to move said flow controller means between its first and second positions and to maintain said flow controller means in its first position at engine speeds below a fixed engine speed and to maintain said flow controller means in its second position at engine speeds above a fixed engine speed.

7. The apparatus of claim 6, wherein said flow controller means is a valve and said control means is a spring biased mounting for said valve biasing said valve against engine suction towards its first position.

8. The apparatus of claim 7, wherein there is a common plenum chamber at the upstream end of each of said runner portions for commonly supplying the runner portion with working fluid.

9. The apparatus of claim 8, wherein said flow controller means is a plate pivotally mounted about a fixed axis for movement between its first and second positions, and said control means includes a torsion spring biasing said plate to its first position, and the area of said plate within the cross sectional area of said second runner is eccentric with respect to said fixed pivot access so as to provide a net force as caused by engine suction to rotate said plate towards its second position.

* * * * *